US010634481B2

(12) United States Patent
Thomason (10) Patent No.: US 10,634,481 B2
(45) Date of Patent: Apr. 28, 2020

(54) TOWER GUY WIRE MAINTENANCE APPARATUS

(71) Applicant: Justin Scott Thomason, Mt. Vernon, IN (US)

(72) Inventor: Justin Scott Thomason, Mt. Vernon, IN (US)

( * ) Notice: Subject to any disclaimer, the term of this patent is extended or adjusted under 35 U.S.C. 154(b) by 263 days.

(21) Appl. No.: 15/932,461

(22) Filed: Feb. 28, 2018

(65) Prior Publication Data

US 2019/0265014 A1   Aug. 29, 2019

Related U.S. Application Data

(60) Provisional application No. 62/605,078, filed on Jul. 31, 2017.

(51) Int. Cl.
| G01B 7/12 | (2006.01) |
| G01B 7/04 | (2006.01) |
| G01B 11/02 | (2006.01) |
| E04H 12/20 | (2006.01) |

(52) U.S. Cl.
CPC ............. *G01B 7/125* (2013.01); *E04H 12/20* (2013.01); *G01B 7/042* (2013.01); *G01B 11/022* (2013.01)

(58) Field of Classification Search
CPC ...... G01B 7/125; G01B 7/042; G01B 11/022; G01N 21/952
See application file for complete search history.

(56) References Cited

U.S. PATENT DOCUMENTS

| 4,887,155 A * | 12/1989 | Massen ................ D01G 31/006 348/88 |
| 5,804,964 A * | 9/1998 | Hamelin ................ G01N 27/82 324/227 |
| 7,496,454 B2 * | 2/2009 | Rogers ................ G01M 5/0025 702/33 |
| 7,795,604 B2 * | 9/2010 | Watabe .................... B60M 1/28 250/559.01 |
| 8,640,558 B2 * | 2/2014 | Cabuz .................... G01N 21/88 73/865.8 |
| 10,222,351 B2 * | 3/2019 | Kondoh ................ G01N 27/82 |
| 10,352,683 B2 * | 7/2019 | Ouellette ............... G01N 27/82 |
| 2007/0113640 A1 * | 5/2007 | De Jesus ................ E21B 19/22 73/158 |
| 2007/0186671 A1 * | 8/2007 | Rogers ................ G01M 5/0025 73/800 |
| 2008/0225305 A1 * | 9/2008 | Barea .................. B65H 63/0324 356/625 |

(Continued)

FOREIGN PATENT DOCUMENTS

| CN | 2914418 Y | * | 6/2007 |
| JP | 60173436 A | * | 9/1985 | ............... G01L 5/10 |

(Continued)

OTHER PUBLICATIONS ip.com English translation of JP 2000-9695 A (Published Jan. 2000).*

(Continued)

*Primary Examiner* — John Fitzgerald
(74) *Attorney, Agent, or Firm* — George H. Morgan (57) ABSTRACT

An operator controlled wire rope maintenance apparatus for remotely discerning and locating wire rope wear problems.

9 Claims, 12 Drawing Sheets

(56) References Cited

U.S. PATENT DOCUMENTS

| | | | | |
|---|---|---|---|---|
| 2009/0079997 A1* | 3/2009 | Watabe | ............... | B60M 1/28 |
| | | | | 356/636 |
| 2013/0061696 A1* | 3/2013 | Cabuz | ............... | G01N 21/88 |
| | | | | 73/865.8 |
| 2017/0023347 A1* | 1/2017 | Ouellette | ............ | G01B 7/046 |
| 2017/0038338 A1* | 2/2017 | Kondoh | ............. | G01N 27/83 |
| 2019/0063903 A1* | 2/2019 | Dou | ............... | G01N 21/952 |

FOREIGN PATENT DOCUMENTS

| | | | | | |
|---|---|---|---|---|---|
| JP | 61057257 A | * | 3/1986 | | |
| JP | 2014159971 A | * | 9/2014 | ............ | B60M 1/28 |
| JP | 2017-225326 A | * | 12/2017 | | |

OTHER PUBLICATIONS ip.com English tranlsation of JP H10-191517 A (Published Jul. 1998).* ip.com English translation of KR 10-1131604 B1 (Published Mar. 2012).*

* cited by examiner

TOWER GUY WIRE MAINTENANCE APPARATUS

CROSS REFERENCES TO RELATED APPLICATIONS

Provisional Application for Patent 62/605,078 filed Jul. 31, 2017 with the same title: Tower Guy Wire Maintenance Apparatus which is hereby incorporated by reference. Applicant claims priority on material disclosed per 35 U.S.C. 119(c)(i).

A portion of the disclosure of this patent document contains material to which claims for copyrights are made. The copyright owners have no objection to the facsimile reproduction of by anyone of the patent document or the patent disclosure, as it appears in the Patent and Trademark Office Patent file or records, but reserves all other copyrights whatsoever.

STATEMENTS AS TO RIGHTS TO INVENTIONS MADE UNDER FEDERALLY SPONSORED RESEARCH AND DEVELOPMENT

Not applicable

BACKGROUND OF THE INVENTION

1. Field of the Invention

This invention relates to a guy wire rope maintenance apparatus for inspection and performing maintenance.

2. Background Information

Tall towers often have guide wires. These guide wires must be periodically inspected and maintained by the application of rust preventative fluids which are manually applied. The inspection and fluid applications are all done manually. This involves multiple personnel crews and physical access by heavy equipment. Usually a worker has to be pulled up and down a guide wire. The above tasks are very dangerous, and there are fatalities from falls.

As will be seen from the subsequent description of the preferred embodiments of the present invention, this present invention has significant advantages over existing practices of tall tower guy wire inspection and maintenance practices.

SUMMARY OF THE INVENTION

The preferred embodiment of the present invention is a wire rope maintenance apparatus developed for, but not restricted to, tall tower guy wire ropes comprising a frame, a at least one power source, a distance meter, a least one tensioner, at least one drive motor, at least one rotary wire brush driven by at least one drive motor, at least one linear actuator tensioner, a tension load cell, a wire measuring sensor, a WIFY with antenna, a camera, a fluid tank, a solution capsule, at least one LED, such as, but not restricted to a white LED, a red LED, a blue LED, or green LED, a handle, a fluid solution, a wire rope, a control panel, a MCU (Micro Computer Unit), an offset aperture, a battery box, a battery support, a distance counter mounting, a tensioner pulley, a tensioner pulley mount, a wire measuring sensor mount, at least one camera, at least one camera mount, a fill cap, a fluid pump, tubing, tank mount, a solution capsule mount, a latch, a hinge, a sponge foam dispenser, and an electric wiring harness.

This is an operator controlled apparatus to inspect, service, and coat guy wires, without the requirement for multiple man crews and heavy equipment. The apparatus can be readily installed on a wire, such as, but not restricted to a guy wire rope, loaded with processing fluids and sent on its way. The wire tender inspects wire on the initial run, and if the wire meets requirements, the wire tender applies fluid on the return trip. Brushing off surface rust can be done in either the initial run or the return trip. Multiple chemical coatings can also be applied.

It is a remote control wireless apparatus.

This invention is directed, but is not restricted, to tall tower guy wire inspection and maintenance.

DESCRIPTION OF THE PREFERRED EMBODIMENTS

Figure 12:
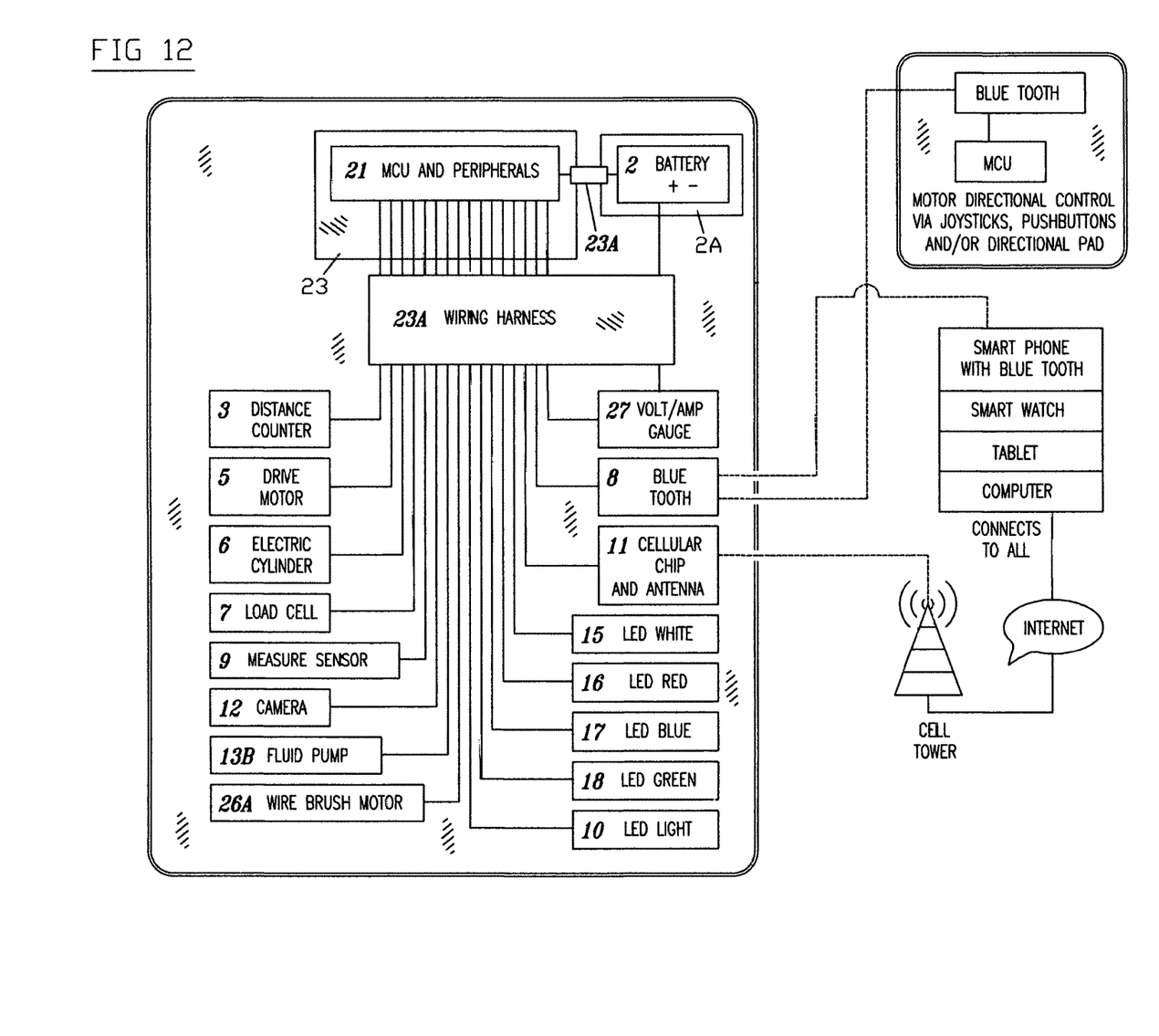
FIG. 12 is an electrical schematic of the various embodiments 100, 101, and 102 of the present invention.

FIG. 12 is an electrical schematic of the electronic communications between the elements shown in the drawings of the preferred embodiment of the present invention.

Referring to FIGS. 1 through 11, the wire rope maintenance apparatus 100 comprises a frame 1 with and offset aperture 1A, a battery 2, with a battery box 2A, a battery support 2B, with battery box mounting bolts 2C, a distance counter 3 with distance counter mounting 3A, a tensioner 4 with a tensioner pulley 4A and a tensioner pulley mount 4B, at least one drive motor 5 with a drive pulley 5A, a drive shaft 5B, and a drive mount 5C, a circular wire brush (not shown, but well known in the trade) driven by at least one drive motor 5, an electric cylinder 6 with a cylinder mount 6A, a load cell 7, a wire measure sensor 9 with a wire measuring sensor mount 9A, an LED (light emitting diode) 10, a cellular chip and antenna assembly 11, at least one camera 12 with a camera mount 12A, a fluid reservoir 13 with a fill cap 13A, at least one fluid pump 13B, tubing 13C, and a tank mount 13D, a solution capsule 14 with a solution capsule mount 14A, a latch 14B, a hinge 14C, and a sponge foam dispenser 14D, LEDs such as, but not restricted to, at least one white LED 15, at least one red LED 16, at least one blue LED 17, and at least one green LED 18, a handle 19, a fluid solution 20, an MCU 21, a wire rope 22, a control panel 23, a wiring harness 23A, an arm 24, an offset aperture 24A, an arm mount 24B, a shackle 25, at least one wire brush 26, at least one wire brush motor 26A, and at least one wire brush motor mount 26B.

The offset aperture 1A permits the addition of a shackle 25, enabling the hoisting of items such as, but not restricted to, tools (not shown) and other wire rope maintenance items (not shown).

The apparatus 100 is remote controlled, providing multiple wire rope 22 maintenance operations, such as, but not restricted to, wire rope 22 inspection for wear, rust removal, and application of penetration oil which reduces internal friction and forestalls further corrosion.

A least one camera 12 which facilitates inspection by traversing and recording the wire rope 22, transmitting full wire image via cellular chip and antenna assembly 11 communications to a ground based line of sight viewer controllable by an operator in the line of sight of the apparatus 100 by means of, but not restricted to, a four channel remote control/receiver combination (not shown) using a radio UHF (ultra high frequency) communicating with and controlling the control panel 23.

In the preferred embodiment of the present invention, the camera 12 is a high definition digital camera 12.

The measure sensor 9 is usable for, but not restricted to, precise thickness measurement of the wire rope 22 for discerning wire rope 22 dimensions and measuring distance traveled by the assembly 100 on wire rope 22 which can be used for precise location of wire rope 22 problems encountered.

The reservoir 13 can be replaced with the arm 24 which can carry an attached shackle 25 for hoisting various items such as, but not restricted to, tools and maintenance materials.

The preferred embodiment of the assembly 100 is fabricated to service 900 foot long wire ropes 22 in ¼ to ⅝" inch diameters. However, the assembly 100 components can easily be modified to service other diameters.

The apparatus 100 precludes the need to have a man climb a tall tower or ride the wire rope 22 to manually do what the assembly 100 does remotely and automatically, such as, but not restricted to, applying penetrating oil, chemical coatings, fully inspect the wire 22 with a video recording by the at least one camera 12 for review by a customer.

Parts Used in the Preferred Embodiment of the Present Invention

Gama RF 340-4 APR 100 amp reverse polarity 12 volt DC motor controls 4 channel with a 6 pad transmitter.

Power is supplied by battery 2 comprising two Ballistic 8 cell EVO 2 Lithium Ion batteries wired in sequence, 1.7 pounds per battery with 275 cold cranking amps per unit. The at least one drive motor is a ½ horsepower, 10 amp, 12 volt DC worm gear drive.

The at least one pump 13 is a five ampere 12 volt DC diaphragm operated pump, available from GENERAL MOTORS™ known to the automotive industry and used in many automobiles.

A suitable digital camera 12 is a SKI VIPER™.

The measure sensor 9 was purchased from Harbor Freight™, a well known supplier to mechanics and tradesmen.

The pulleys 4A, 5A were purchased from Lowes™ Hardware.

LEDs 15, 16, 17, and 18 came from China.

Frame 1 was manufactured by applicant. Applicant also assembled the apparatus 100.

Method Of Operation

Install apparatus 100 on the wire rope 22 to be serviced.

Figure 1:
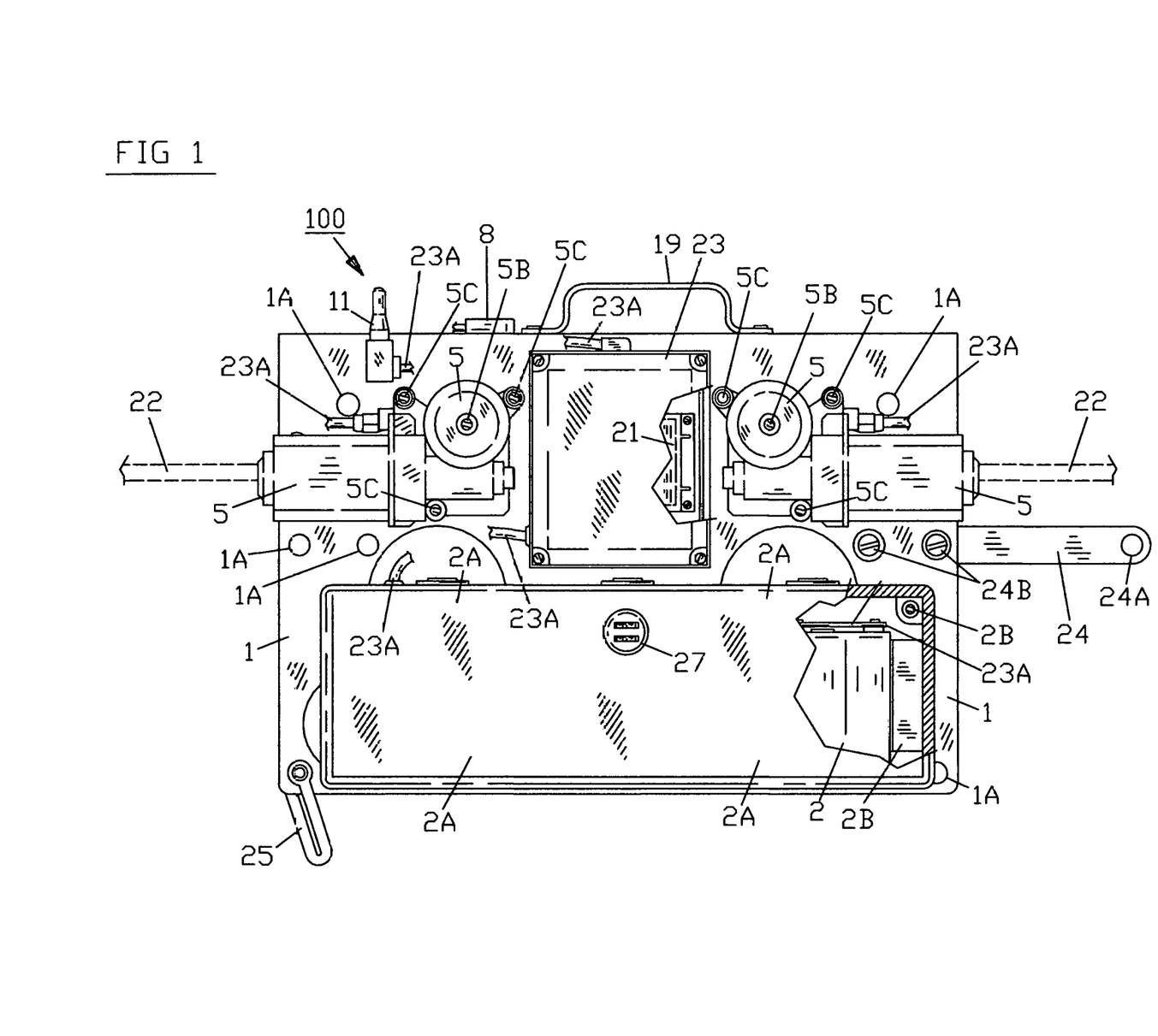
FIG. 1 is a side view of a wire rope maintenance apparatus 100.
Figure 2:
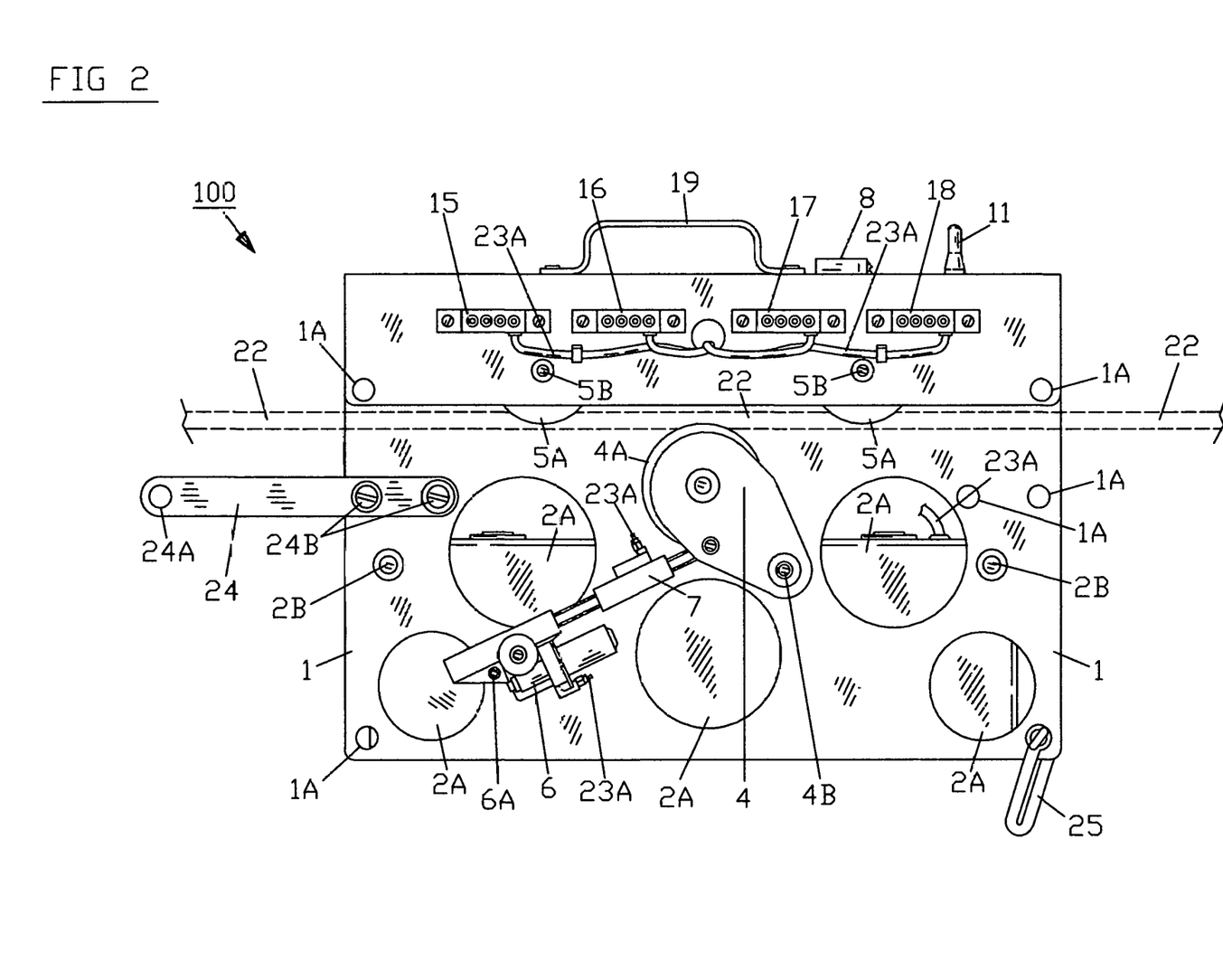
FIG. 2 is an opposite side view of the wire rope maintenance apparatus 100 which illustrates LEDs 15, 16, 17, and 18.
Figure 3:
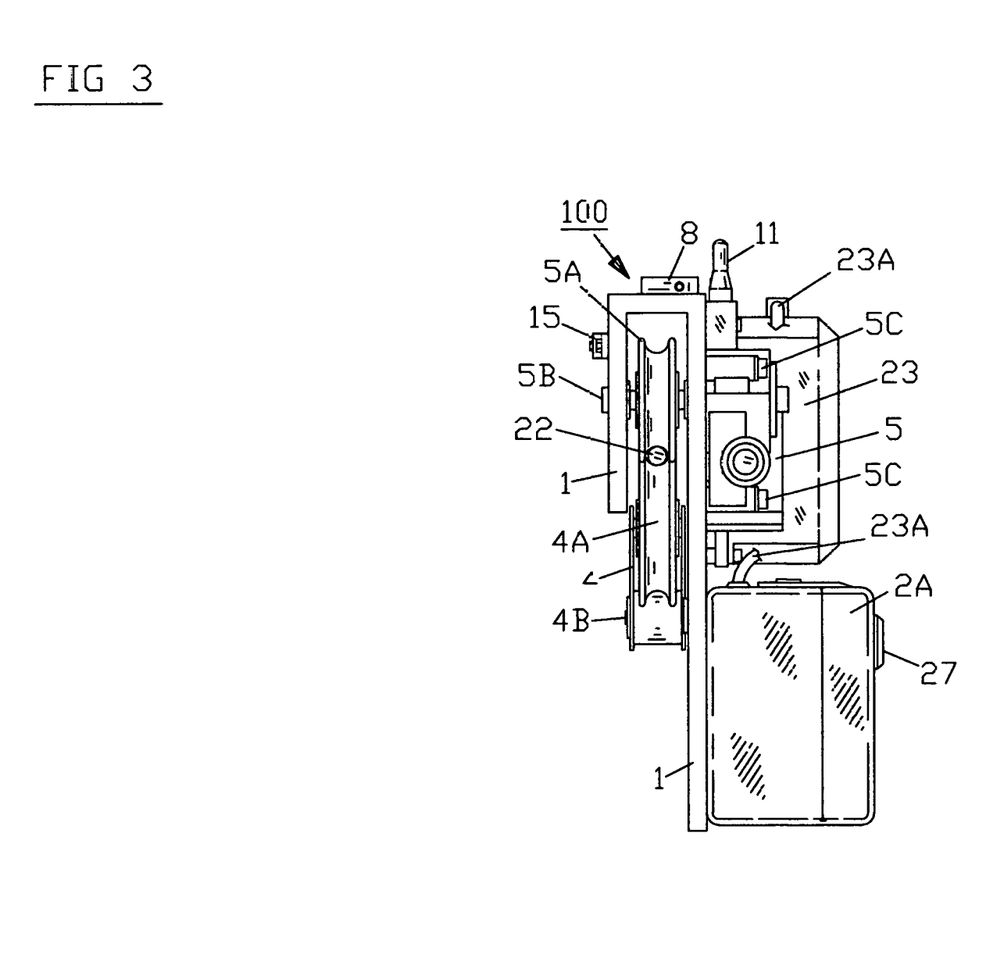
FIG. 3 is an end view of the wire rope maintenance apparatus 100.
Figure 4:
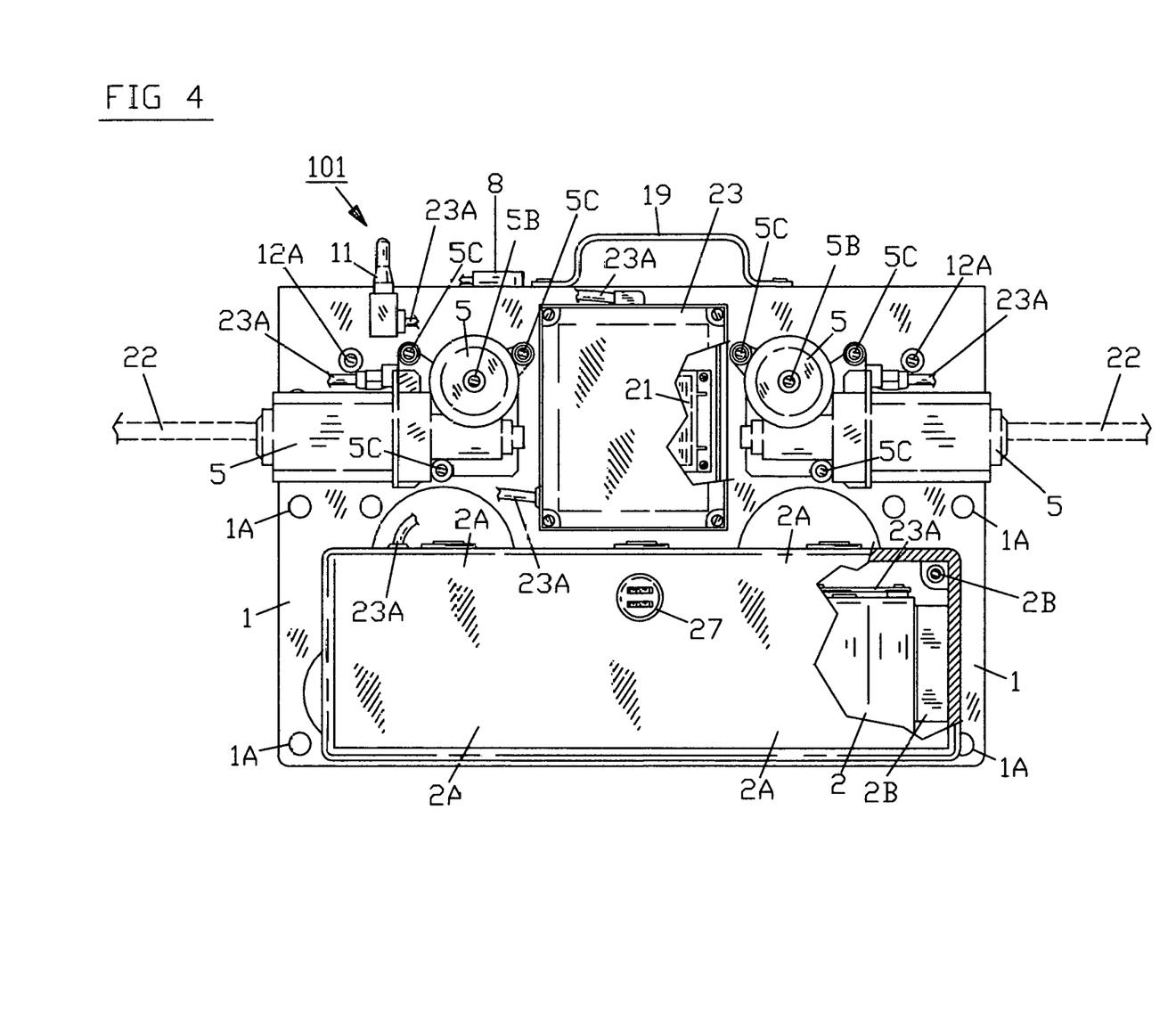
FIG. 4 is a side view of the wire rope maintenance apparatus with a detail number 101 which lacks a shackle 25 and an arm 24.

Install drive pulleys 5A in both fore and aft positions. If needed, apply tension on the wire rope 22 by means of the tensioner 4 with the tensioner pulley 4A and the tensioner pulley mount 4B (Ref. FIG. 2).

Run a systems check of cellular chip and antenna assembly 11 and at least one camera 12.

Figure 7:
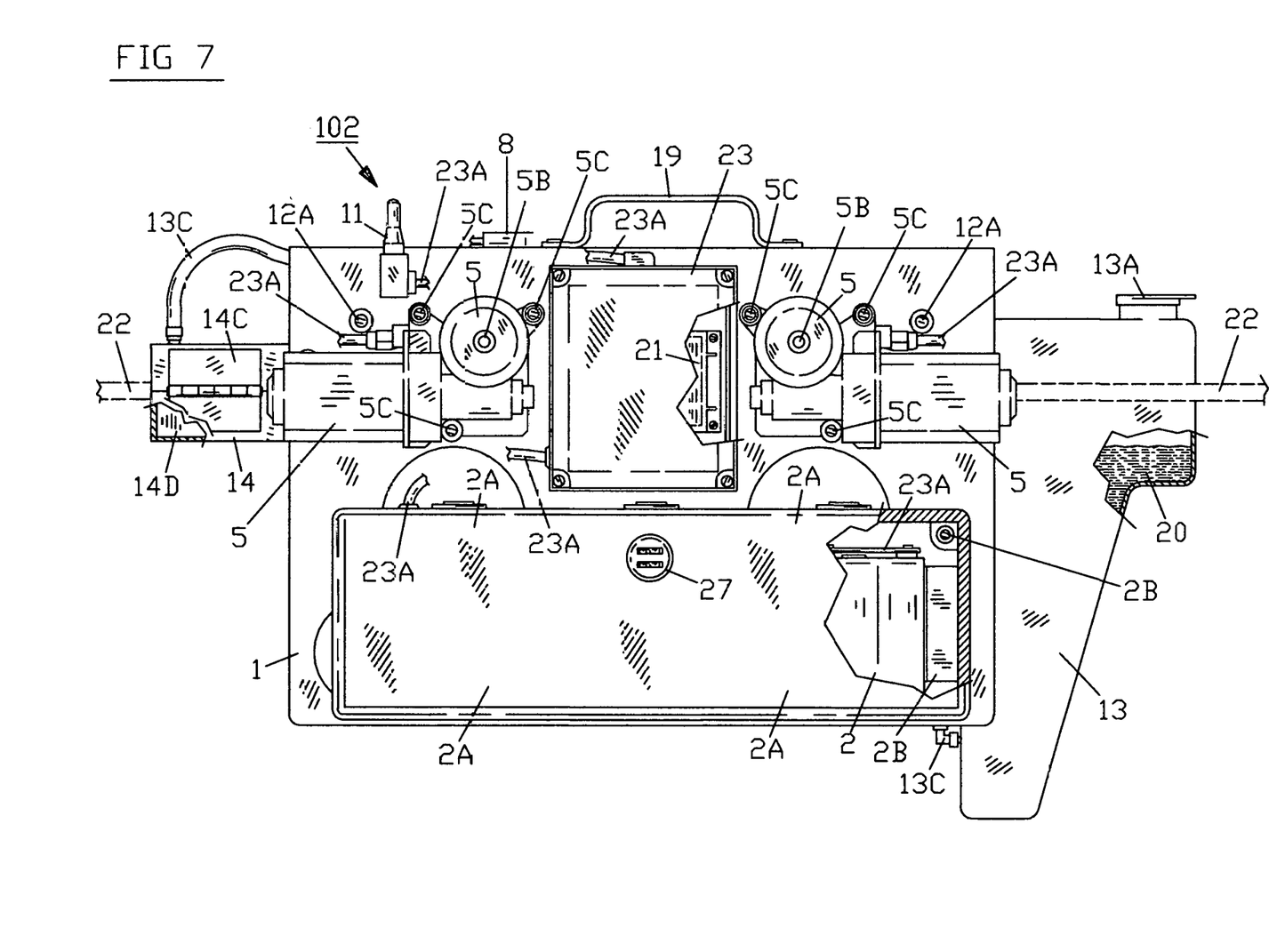
FIG. 7 is a side view of the wire rope maintenance apparatus with illustrating a fluid reservoir 22 and solution capsule 14.
Figure 9:
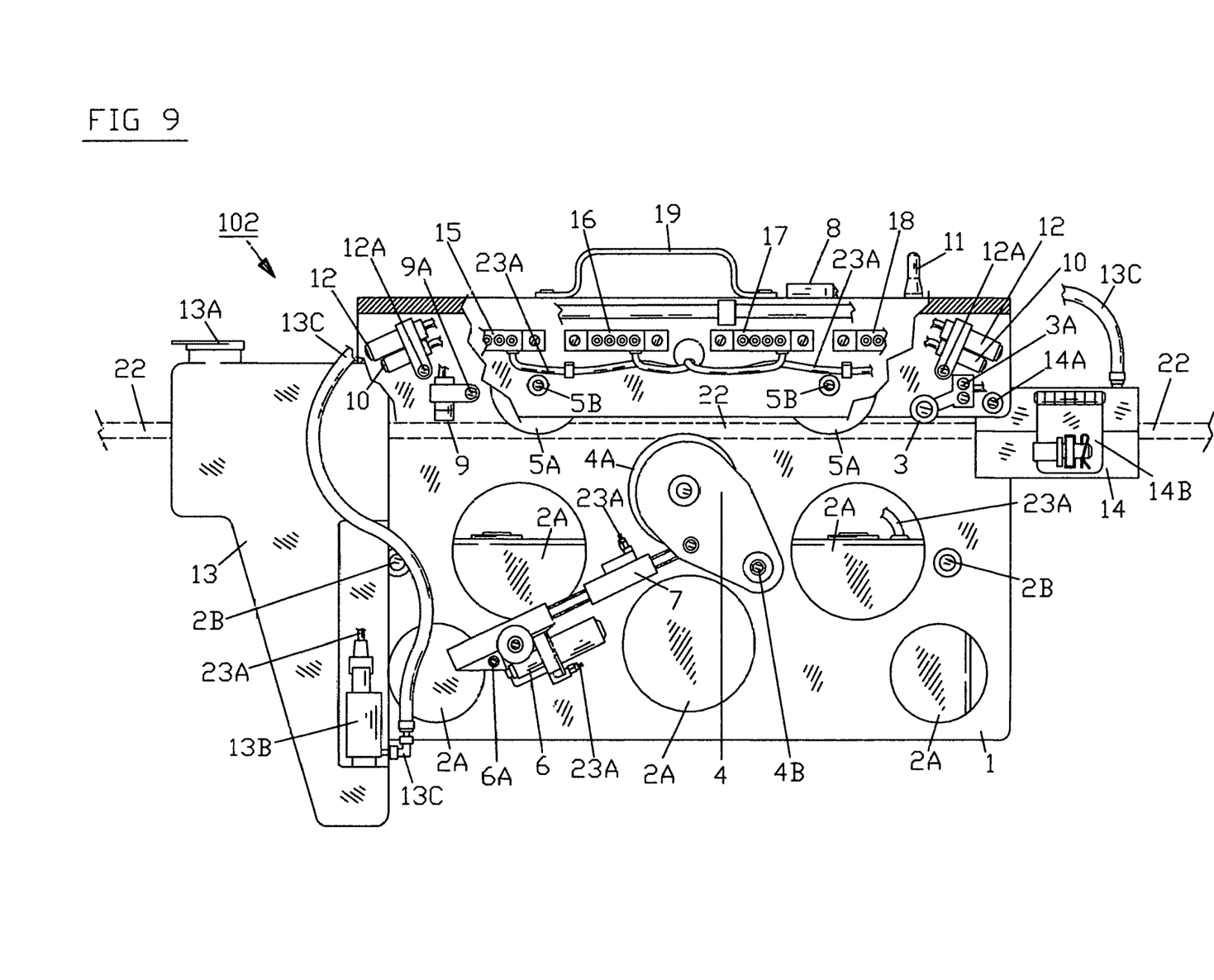
FIG. 9 is the opposite side view of the wire rope maintenance apparatus from FIG. 8 with cutaways illustrating cameras 12 with light emitting diodes 10.

Fill the solutions capsules 14 (Ref. FIGS. 7 and 9) as required.

The operator's control module (not shown) operates in the line of sight.

On the LEDs: Red LED signifies that the at least one drive motor 5 is engaged in forward drive. Green LED 18 signifies the wire rope 22 is meeting diameter specifications. White LEDs 15 are useful for night operations and to provide some illumination for the at least one camera 12. Blue LED 17 indicates the at least one drive motor 5 is in a reverse drive mode of operation.

The apparatus 100 is intended to preclude the need for an operator to ride the wire rope 22 to manually do what the apparatus 100 does remotely and automatically, such as, but not restricted to, application of penetrating oil and other chemical treatments and manual inspection of the wire rope 22 with a video recording by the at least one camera 12 for review by a customer.

Although the description above contains many specificities, these should not be construed as limiting the scope of the invention, but as merely providing illustrations of some of the preferred embodiments of the present invention.

It will be obvious to those skilled in the art that modifications may be made to the embodiments described above without departing from the scope of the present invention.

Figure 5:
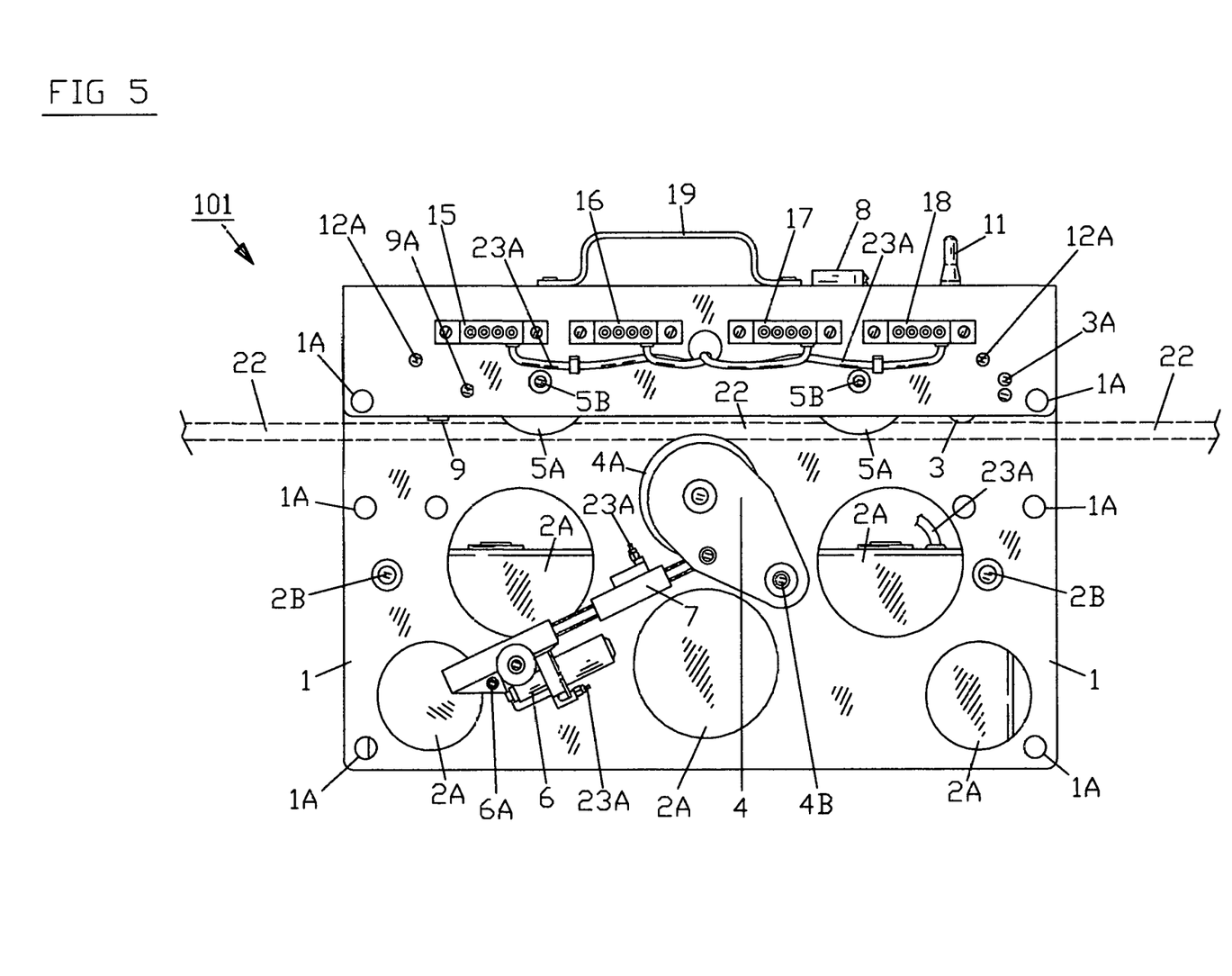
FIG. 5 is an opposite side view of the wire rope maintenance apparatus of FIG. 4 indicating a wire measure sensor 9.
Figure 6:
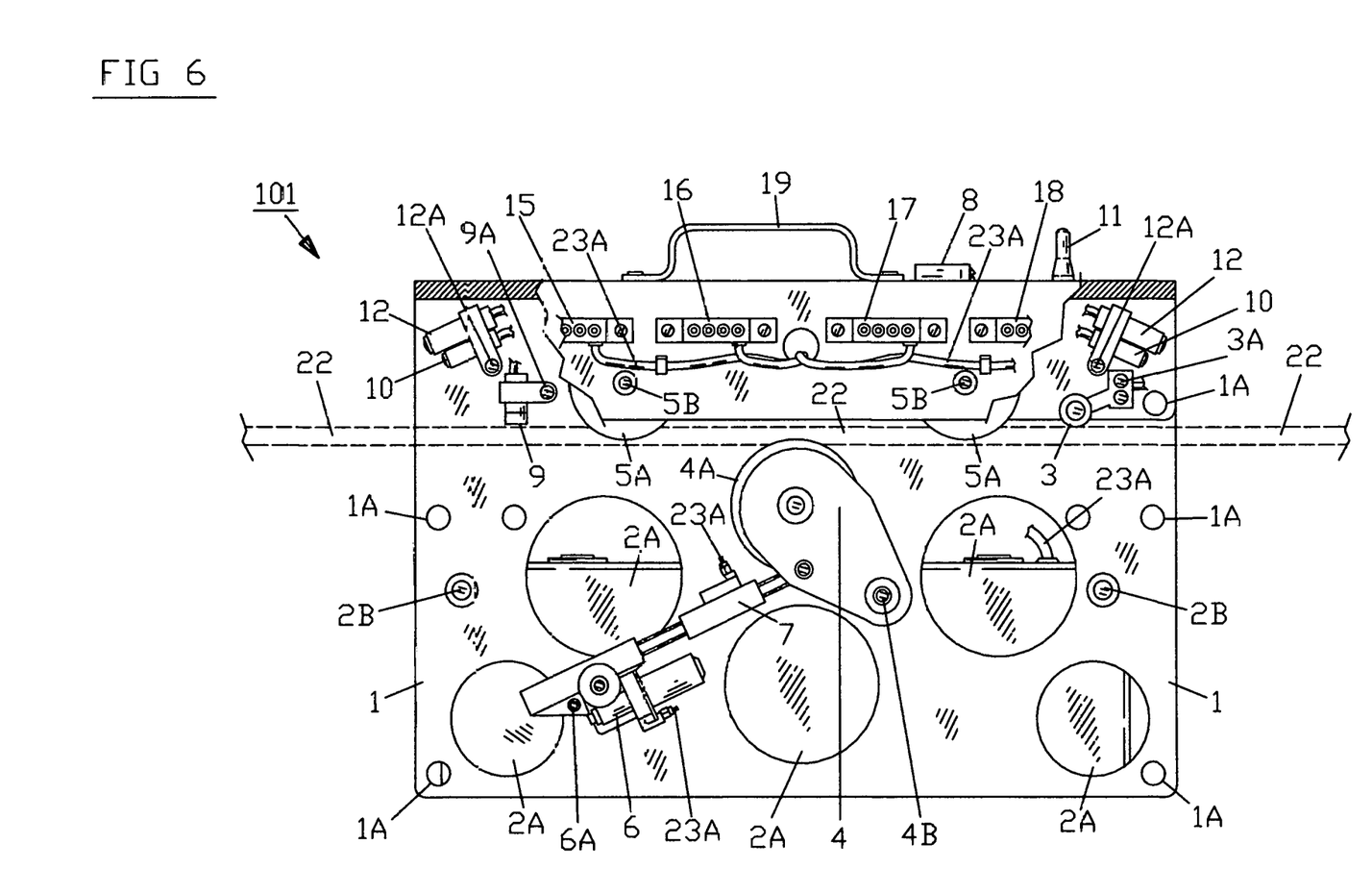
FIG. 6 is the opposite side view of the wire rope maintenance apparatus of FIG. 5 illustrating cameras 12 with light emitting diodes 10 and the wire measure sensor 9.
Figure 8:
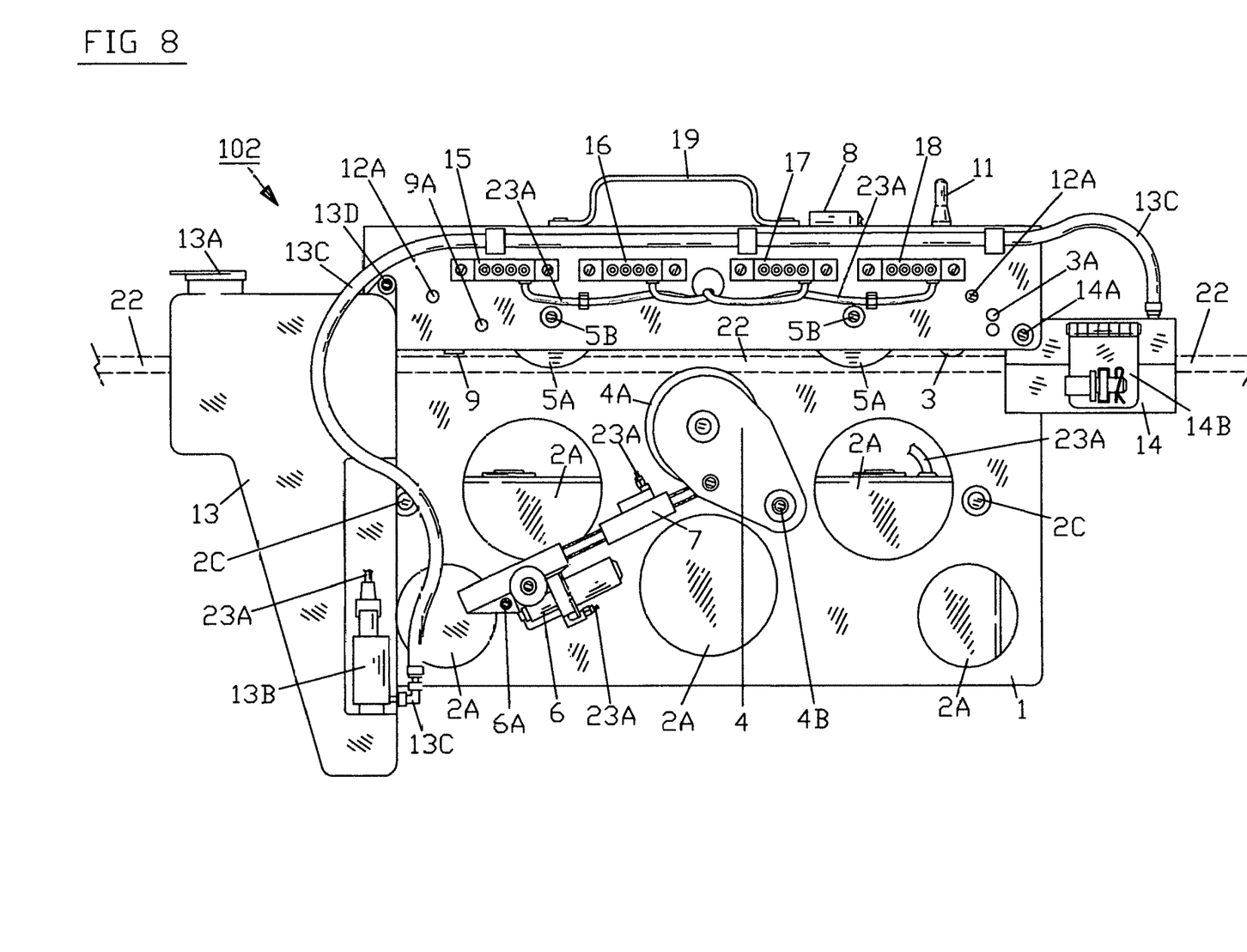
FIG. 8 is an opposite side view of the FIG. 7 wire rope maintenance apparatus illustrating a fluid pump 13B and a solution capsule 14.
Figure 10:
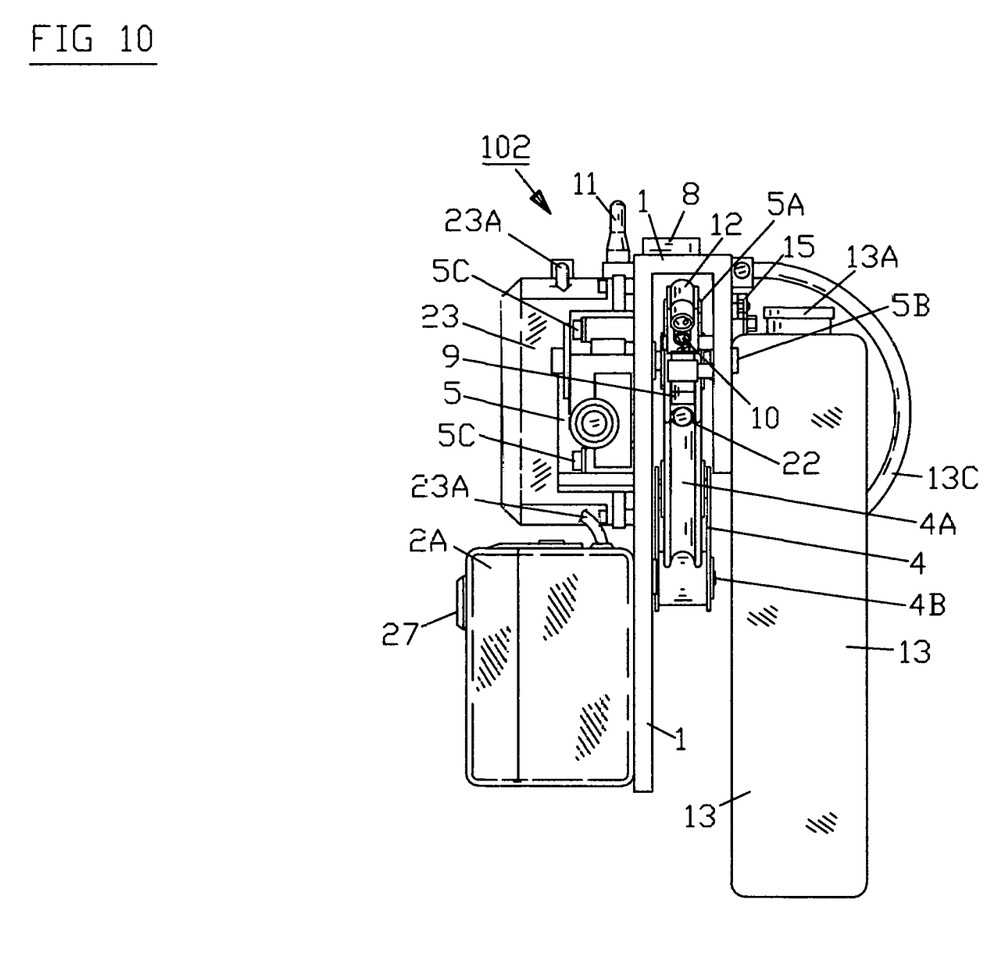
FIG. 10 is an end view of the wire rope maintenance apparatus shown in FIGS. 7, 8, and 9.
Figure 11:
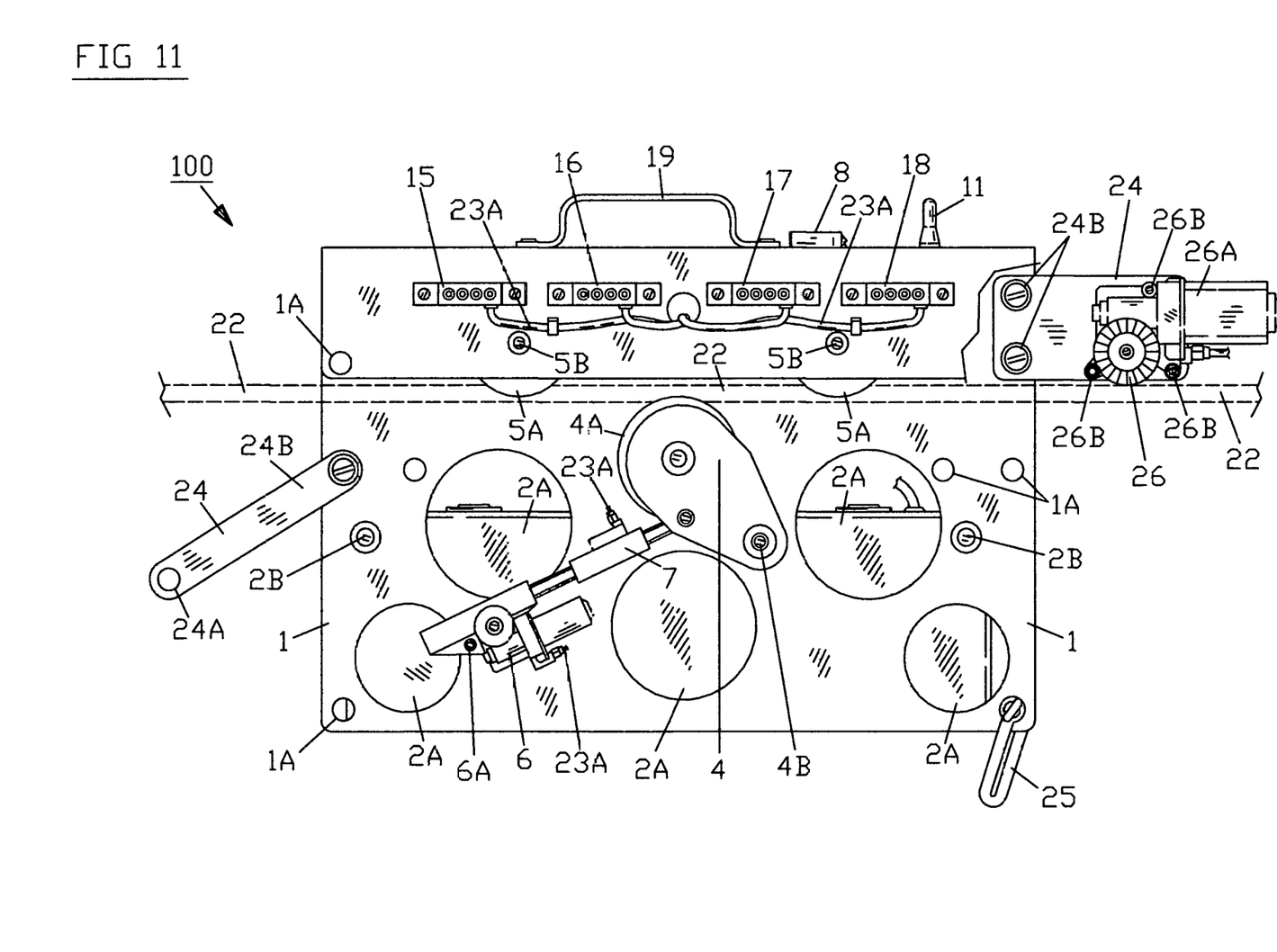
FIG. 11 is an opposite side view of the wire rope maintenance apparatus 100 illustrating a wire brush 26 powered by a wire brush motor 26A.

Detail 101 was used to label the invention in FIGS. 5, 6, and 7 while detail 102 was used to label the invention in FIGS. 8, 9, and 10. They are all part of the invention which is referred to the wire rope maintenance apparatus 100 throughout the disclosure of the invention.

Thus the scope of the invention should be determined by the appended claims in the formal application and their legal equivalents, rather than by the examples given.

I claim:

1. A wire rope maintenance apparatus comprising:
a fluid reservoir containing a fluid;
a pump fluidly coupled to the fluid reservoir via tubing;
a control panel configured to operate and control the wire rope maintenance apparatus via wireless communication with a remotely-based operator having a communication and control device;
wherein the control panel is configured to operate the fluid pump to continuously apply the fluid to an existing and previously installed wire rope, on which the wire rope maintenance apparatus is installed, while the wire rope maintenance apparatus traverses a substantial length of the existing previously installed wire rope.

2. The wire rope maintenance apparatus of claim 1, further comprising:
a sensor for measuring at least one dimensional aspect of the existing and previously installed wire rope.

3. The wire rope maintenance apparatus of claim 1, further comprising:
a drive motor configured to drive the wire rope maintenance apparatus in a forward mode and a reverse drive mode.

4. The wire rope maintenance apparatus of claim 1, wherein: the fluid is a chemical coating, a rust preventative, or a penetrating oil.

5. The wire rope maintenance apparatus of claim 1, further comprising: at least one camera for inspecting the existing and previously installed wire rope; the at least one camera being configured to capture one or more images of the existing and previously installed wire rope; and the control panel further configured to wirelessly transmit the one or more images to the remotely-based operator having the communication and control device.

6. The wire rope maintenance apparatus of claim 5, wherein: the at least one camera is a high definition digital camera.

7. The wire rope maintenance apparatus of claim 1, further comprising: at least one wire brush.

8. The wire rope maintenance apparatus of claim 4, wherein: the control panel is further configured to operate the at least one wire brush to continuously remove rust or corrosion on the surface of the existing and previously installed wire rope while the wire rope maintenance apparatus traverses the length of the existing and previously installed wire rope.

9. A method of operating the wire rope maintenance apparatus of claim 8, comprising the steps of:

(a) operating the wire brush to continuously remove rust or corrosion from the existing and previously installed wire rope during an initial run of the wire rope maintenance apparatus along the length of the existing and previously installed wire rope;

(b) operating the pump to continuously apply the fluid to the existing and previously installed wire rope during a return trip of the wire rope maintenance apparatus along the length of the existing and previously installed wire rope.

\* \* \* \* \*